J. HEINRICH.
APPARATUS FOR SEPARATING SHEETS FROM A PILE OR STACK.
APPLICATION FILED MAY 27, 1914.
1,143,708.
Patented June 22, 1915.
7 SHEETS—SHEET 2.
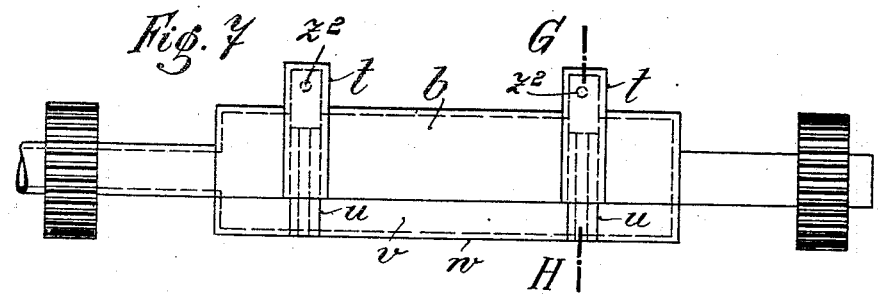
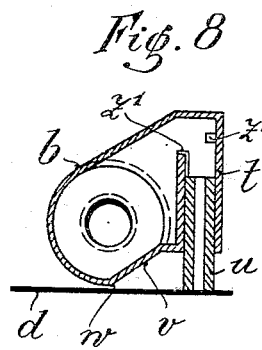
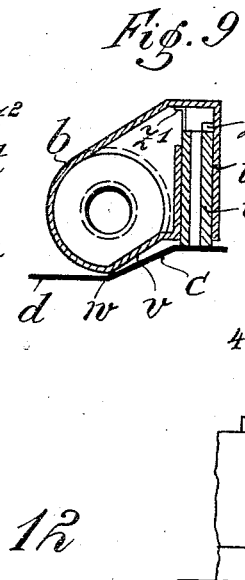
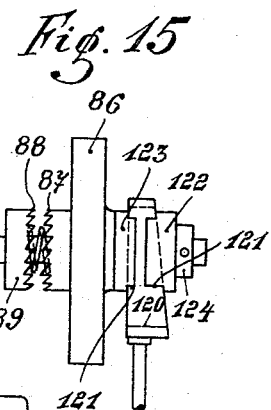
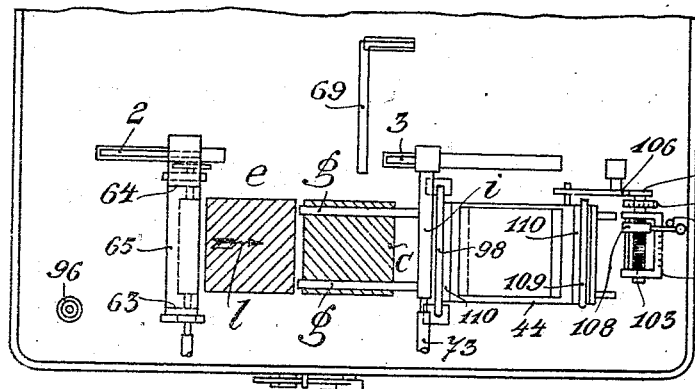
Witnesses:
R. Richardson
Henri Franck
Inventor
Jacob Heinrich
by Otto
his Attorney J. HEINRICH.
APPARATUS FOR SEPARATING SHEETS FROM A PILE OR STACK.
APPLICATION FILED MAY 27, 1914.

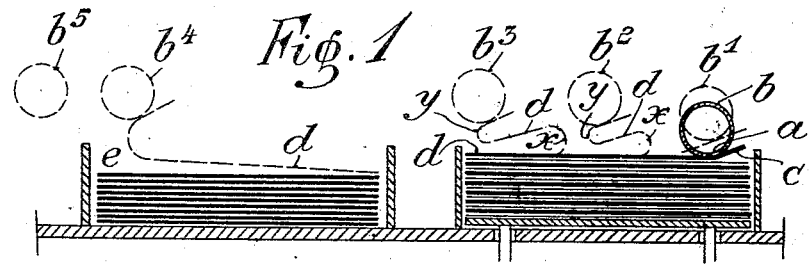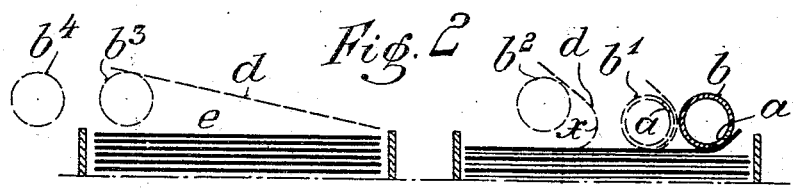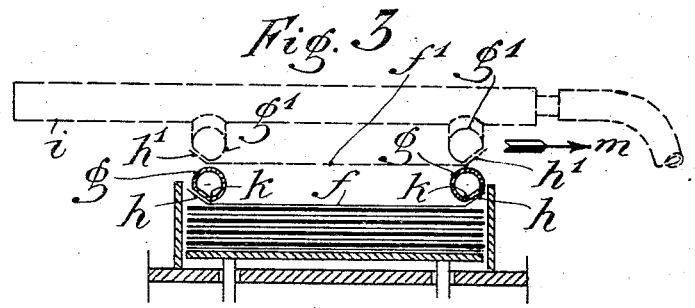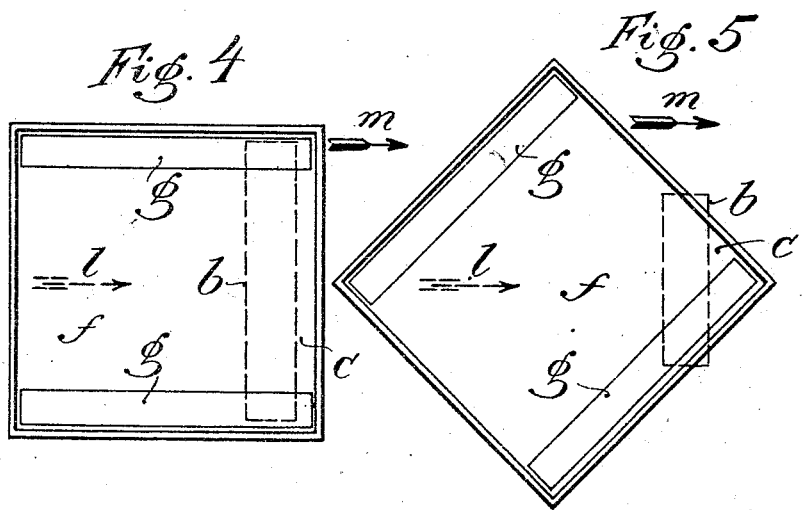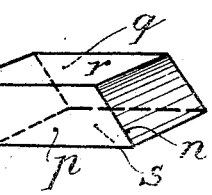

1,143,708. Patented June 22, 1915.
7 SHEETS—SHEET 3.

Witnesses:
R. Richardson
Clarice Frame

Inventor
Jacob Heinrich
by Ottman
his Attorney

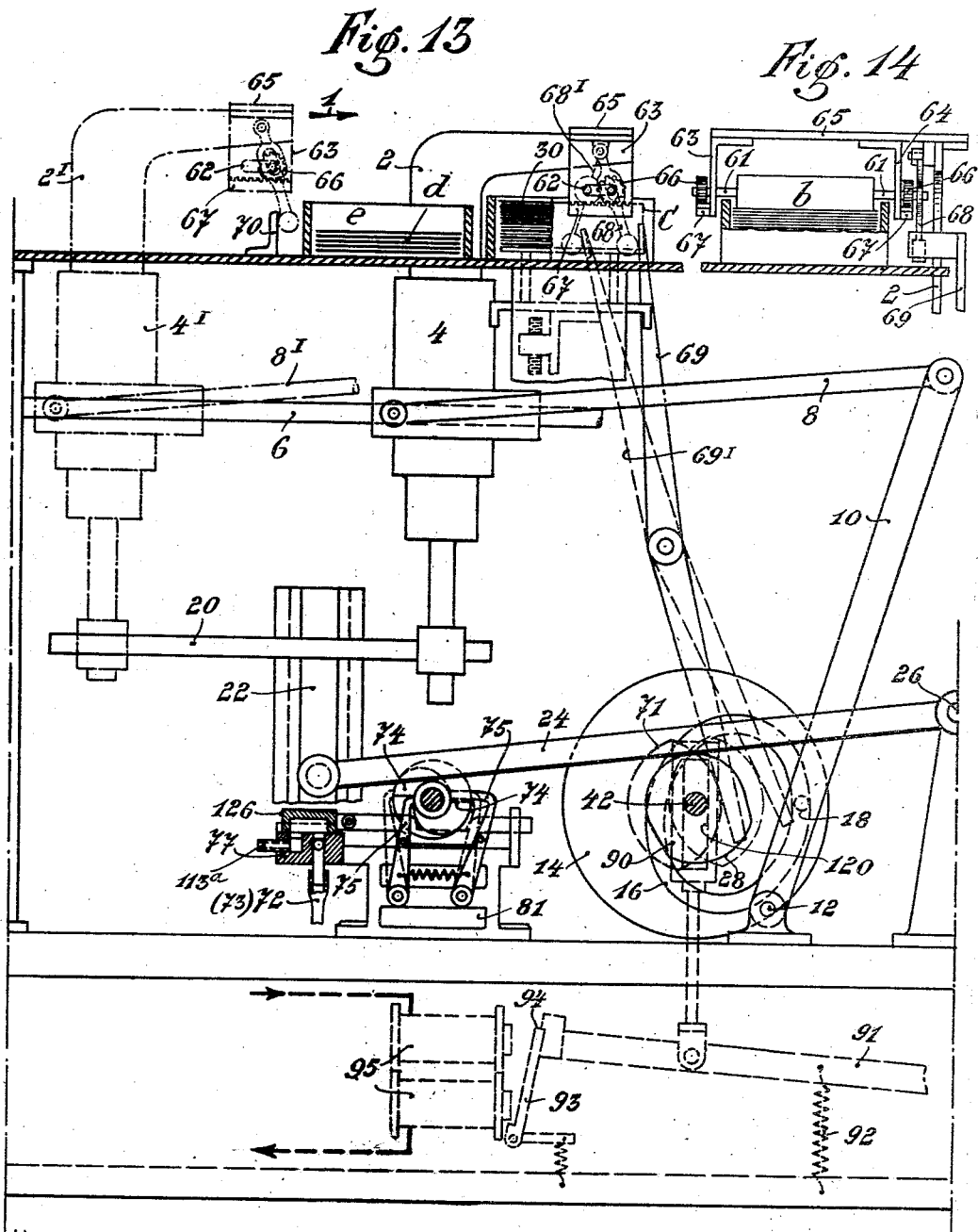

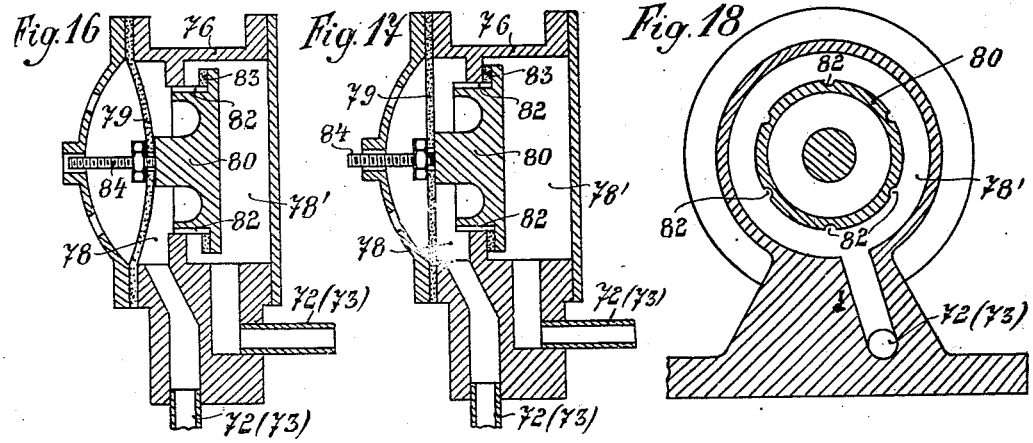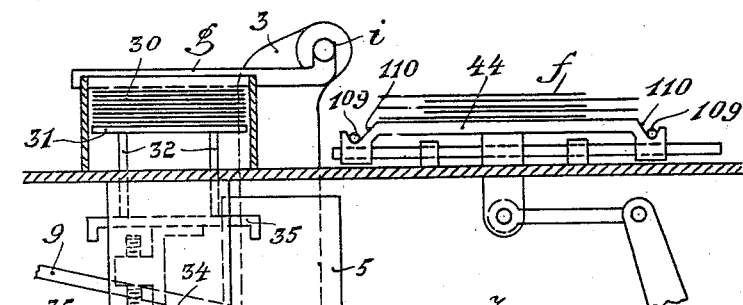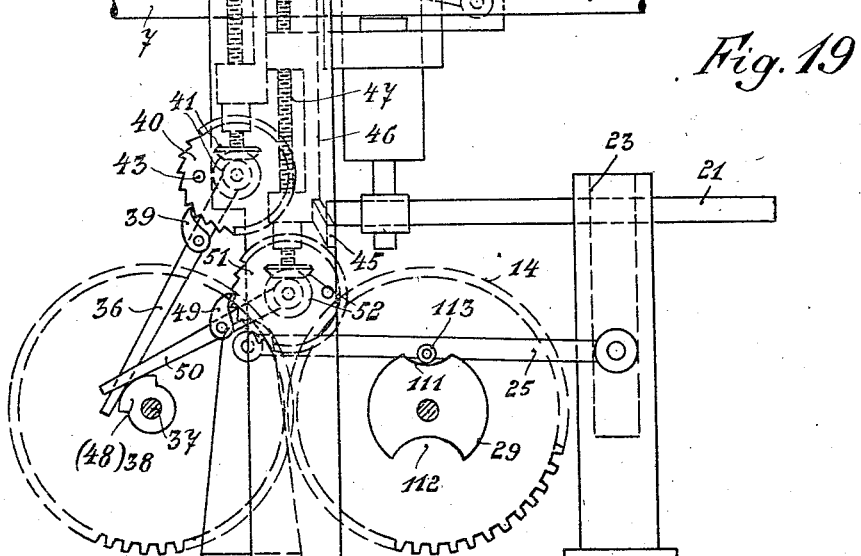

J. HEINRICH.
APPARATUS FOR SEPARATING SHEETS FROM A PILE OR STACK.
APPLICATION FILED MAY 27, 1914.
1,143,708.
Patented June 22, 1915.
7 SHEETS—SHEET 6.
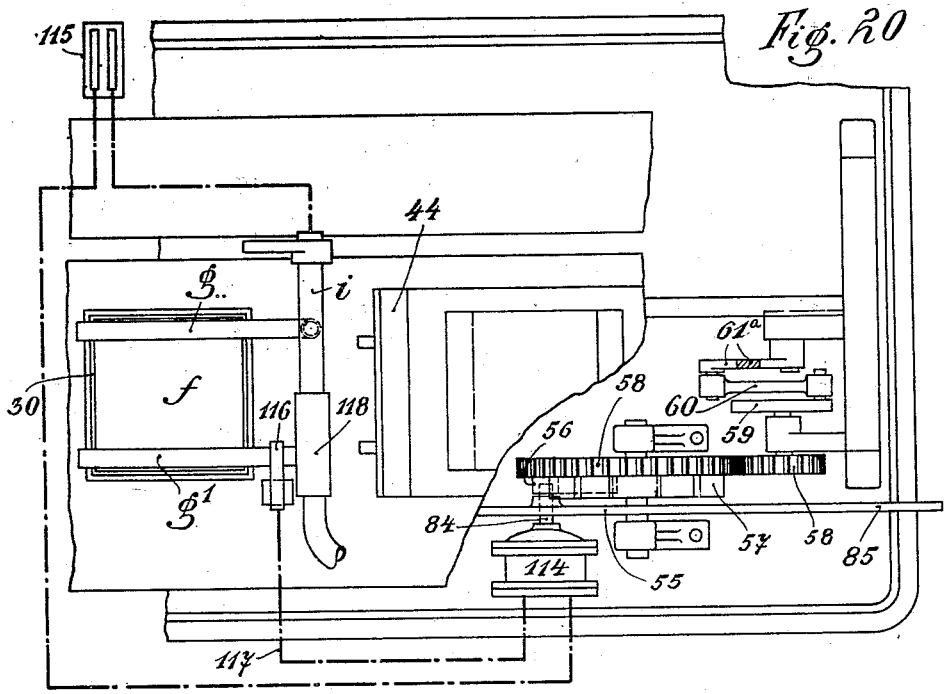
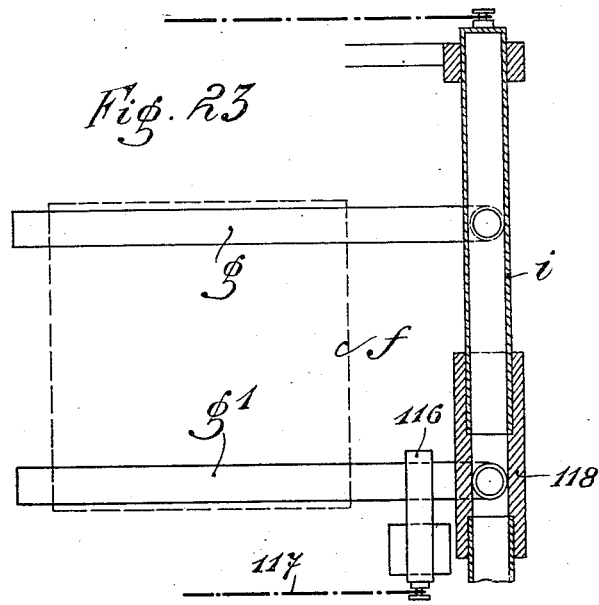

J. HEINRICH.
APPARATUS FOR SEPARATING SHEETS FROM A PILE OR STACK.
APPLICATION FILED MAY 27, 1914.

1,143,708.

Patented June 22, 1915.
7 SHEETS—SHEET 7.

UNITED STATES PATENT OFFICE.

JACOB HEINRICH, OF NUREMBERG, GERMANY, ASSIGNOR TO THE FIRM OF METALLPAPIER - BRONZEFARBEN - BLATTMETALLWERKE AKTIENGESELL-SCHAFT, OF MUNICH, GERMANY.

APPARATUS FOR SEPARATING SHEETS FROM A PILE OR STACK.

1,143,708.

Specification of Letters Patent. Patented June 22, 1915.

Application filed May 27, 1914. Serial No. 341,273.

*To all whom it may concern:*

Be it known that I, JACOB HEINRICH, subject of Germany, residing at Nuremberg, Bavaria, Germany, have invented certain new and useful Improvements in Apparatus for Separating Sheets from a Pile or Stack; and I do hereby declare the following to be a full, clear, and exact description of the invention, such as will enable others skilled in the art to which it appertains to make and use the same.

Figure 10:
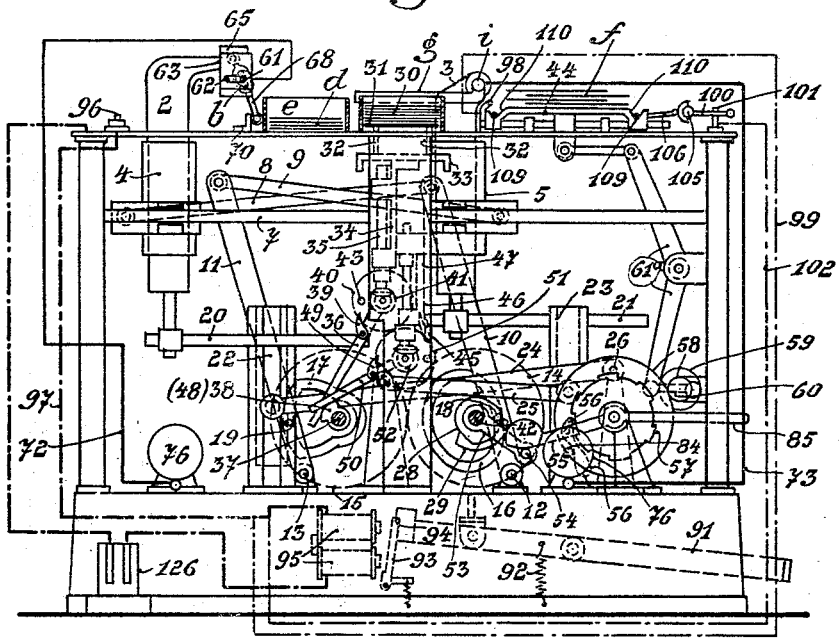
Figure 11:
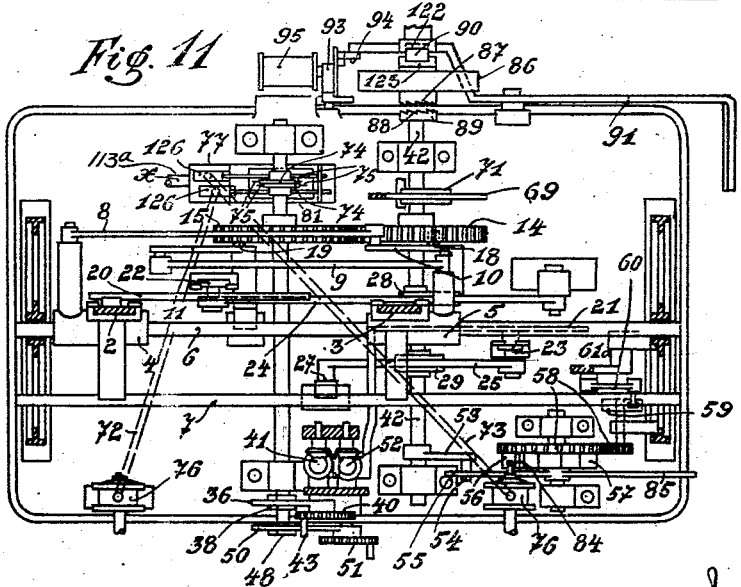
Figure 21:
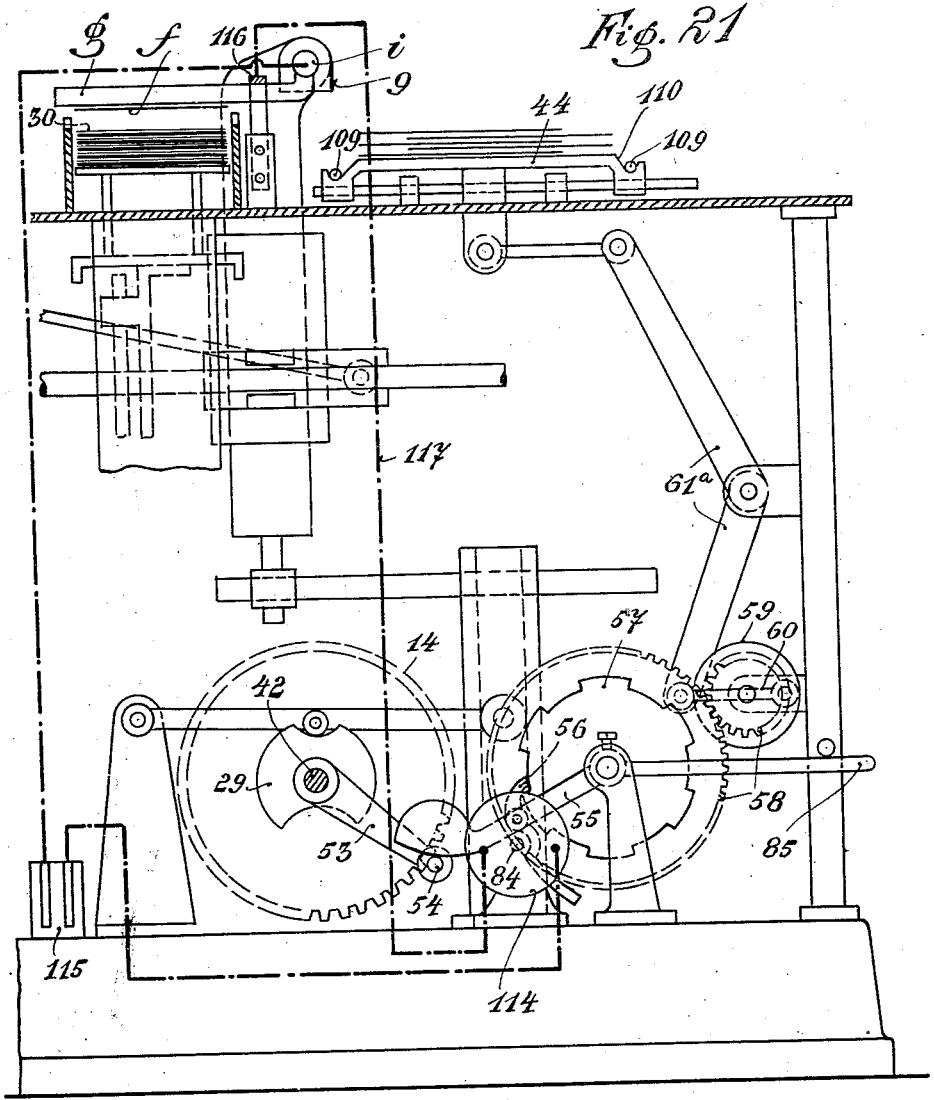
Figure 22:
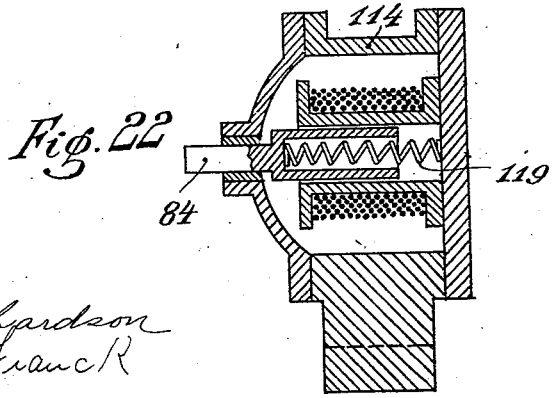

My invention relates to an apparatus for separating sheets from a pile or stack, and comprises the features hereinafter to be fully described and illustrated in the accompanying drawings wherein, Figure 1 is a diagrammatic view representing the operation of removing cover sheets from a pile; Fig. 2 is a similar view of a slightly modified operation; Fig. 3 is a similar view illustrative of the operation of raising and removing foil sheets from a pile; Figs. 4 and 5 are modifications, respectively, of the method of operation illustrated in Fig. 3; Fig. 6 is a perspective view of a stack or pile of sheets in position to have the sides brushed; Fig. 7 is a front elevational view of a modified form of suction mechanism for removing sheets from the pile; Fig. 8 is a vertical sectional view, on the line G—H of Fig. 7, showing the suction plunger protracted; Fig. 9 is a similar view showing the suction plunger retracted; Fig. 10 is a side elevational view, partly in section, of the entire machine embodying my invention; Fig. 11 is a plan view of the lower part of the machine shown in Fig. 10; Fig. 12 is a partial plan view, parts appearing in section, of the upper part of the machine shown in Fig. 10; Fig. 13 is a vertical sectional view of a portion of the machine shown in Fig. 10 and illustrating the mechanism for removing cover sheets from the pile; Fig. 14 is a partial front elevational view of Fig. 13; Fig. 15 is an elevational view of mechanism which coöperates in stopping the machine under certain conditions; Figs. 16 to 18 are sectional views of valves controlling the supply of compressed air to the sheet removing mechanism; Fig. 19 is a vertical sectional view, parts appearing in elevation, of mechanism for actuating the means which remove foil sheets from the pile; Fig. 20 is a similar view of a somewhat modified form of such mechanism; Fig. 21 is a plan view of that portion of the mechanism illustrated in Fig. 20; Figs. 22 and 23 are details of parts shown in Figs. 20 and 21.

The usual method of separating sheets of metal foil from a pile in which the sheets alternate with what may be called cover sheets, consists in applying an intermittently acting sucker to the metal of the top sheet and lifting the latter off. With this method the edges of the foil sheets and cover sheets are liable to stick together so that the use of wipers is required to detach them from each other. The adherence of the sheets to each other is favored by the fact that the edges of the sheets at opposite sides of the pile have always been brushed in opposite directions. What I mean by this is illustrated in Fig. 6 of the accompanying drawings, as the brushing is necessitated by the fact that when the pile is beaten down some of the metal is driven out at the edges and has to be brushed away in order to give the pile a sharp edge and to enable the sheets to be separated. For the purpose of this brushing the pile is pushed aslant as shown in Fig. 6 so that two opposite sides thereof, marked *o* and *n* form parallel inclined surfaces. The surface which slants outward from top to bottom is first brushed in a downward direction, then the pile is turned so that its surface *r* is at the bottom and its surface *s* at the top whereupon the other slanting side surface is brushed from top to bottom. Then the pile is restored to its cubed shape and it will be understood that this operation having been performed, two opposite side surfaces of the pile have been brushed in opposite directions.

According to my invention the opposite sides of the pile are brushed in the same direction. For this purpose the pile may be set aslant as shown in Fig. 6 and brushed downward on one side, but then instead of turning the pile the same is set aslant in the opposite direction and brushed downward on the other side. For the purpose of separating the sheets I also use suckers, but I apply the same at or near the edges of the sheets, so that the foil or cover sheet is erected at the edge and then lifted. There may be a single sucker applied to one edge or a plurality of suckers applied to different edges. In the case of the cover sheets it is sufficient to use a single sucker applied to one edge, then moved across the sheet so as to pull the latter off with a curling movement. In the case of the foil sheets, it is preferable to use at least two suckers.

As shown in Fig. 1, a tubular sucker $b$ having a series of holes or slots $a$ is applied near the edge $c$ of the cover sheet $d$, the holes $a$ being directed obliquely toward the edge. The action of the sucker accordingly raised the edge of the cover sheet as shown in the drawings, whereupon the sucker is lifted to position $b^1$ and is then horizontally moved to positions $b^2$, $b^3$ and $b^4$, the latter being above the place $e$ at which the edge of the cover sheet held by the sucker is to be dropped. After dropping the sheet, the sucker travels to its end position $b^5$. It will be seen that in the course of the traversing movement of the sucker the sheet curls off the pile as indicated by dotted lines.

The mode of operation illustrated in Fig. 2 differs from that previously described only by the fact that before being raised, the sucker makes a partial revolution whereby the cover sheet $c$ is partly rolled upon it. The advantage of this is that when the sucker is raised and traversed, the sheet curling off the pile only makes a single bend $x$ instead of a double or S bend as in Fig. 1.

Fig. 3 illustrates the method of separating a foil sheet $f$. The latter is operated on at two opposite edges $h$ by two sucker arms $g$ projecting from a suction tube $i$, the edges $h$ being transverse to the direction of the horizontal movement of the suction appliance. The sucker tubes $g$ have flat suction surfaces $k$, the perforations of which are covered with gauze or other fine meshed fabric, both surfaces $k$ being inclined to the surface of the pile and facing outward toward the edges $h$. The action of the sucker bends up the edges $h$ of the foil as shown in the drawings, whereupon the suction appliance is raised to the position indicated by broken lines in which $f^1$ designates the foil and $g^1$ the sucker arms holding the edges $h^1$ of the foil. From its raised position the suction appliance is moved in the direction of the arrow $m$, toward the table on which the foil is deposited.

As shown in Fig. 4 the sucker arms $g$ may be applied to two opposite edges of the foil sheet $f$, which are parallel with the direction of the movement $m$ of the suction appliance. If this method is adopted the sucker $b$ indicated by broken lines may be applied in the same position as before for separating the cover sheets, the sucker $b$ being moved across the sheet as indicated by the arrow $l$ toward the edge remote from the side at which it arrives.

Fig. 5 shows an arrangement in which the suckers $g$ are placed diagonally to their direction of movement. In this case also the position of the sucker $b$ is the same as before. Instead of using a sucker with holes directed outward obliquely I may use a sucker such as shown in Figs. 7 to 9 having a piston or pistons adapted to protrude in a downward direction and then recede into the sucker again lifting the sheet with them.

Fig. 8 shows the sucker $b$ in position to engage a sheet and Fig. 9 shows it after lifting the sheet at $c$. This tubular sucker $b$ has at its front or operative edge two box like housings $t$ in each of which a cylinder $u$ having a longitudinal bore is movable. The housings $t$ do not extend outward to the level at which the sucker is applied to the sheet $d$, so that the pistons must issue from the housings in order to contact with the sheet. Preferably the side of the suction tube is flat as shown at $v$ between the part $w$ where the suction tube touches the sheet, and the part where it joins the housing. The flat part $v$ may extend over the whole width of the sucker or only over the width of the sheet. The action is as follows: When the sucker is lowered on to the pile it touches the foil or cover sheet at $w$ and the piston $u$ rests on the sheet close to one edge thereof. When suction is applied the sheet is drawn tightly against the face of the piston so that the lower end of the bore in the latter is closed whereupon the suction lifts the piston into its housing so that the edge of the sheet is drawn upward as shown in Fig. 9, the sheet being drawn approximately parallel with the flat surface $v$. The movement of the piston $u$ is limited by stops $z^1$ and $z^2$. If the sheet is to be drawn off the pile with a curling movement, the sucker is partly rotated as indicated by the arrow in Fig. 9 before it is lifted. The use of at least two suckers applied close to the edges of the sheets has the advantage that it provides a means for interrupting the action in case the suckers carry torn foil sheets to the table. For this purpose it is only necessary to place an electric contact device in the path so that a torn sheet hanging down from the suckers will wipe the contact device and close an electric circuit. The electric device may also be associated with a counting mechanism by which the action is stopped when a predetermined number of sheets have been separated.

As shown in Figs. 10 and 11 the sucker $b$ for separating the cover sheets and the suction appliance $i$, $g$, $g$ for separating the foil sheets are mounted on carriers 2 and 3 which are vertically and horizontally movable. Both these carriers or holders are mounted on carriages 4 and 5 horizontally movable on bars 6 and 7, the carriages being connected by rods 8 and 9 to single armed levers 10 and 11. The latter are fulcrumed at 12 and 13 and actuated by cams 14 and 15 which are integral with toothed wheels and meshing with each other. Each of the cams has an endless surface 16 or 17 whereby it coacts by means of a stud 18 or 19 with the respective lever 10 or 11. For the purpose of vertical movement the holders 2 and 3 are mounted to move vertically in the carriages 4 and 5. They are also horizontally movable on cross arms 20 and 21 of vertically movable slides 22 and 23. The latter are connected to single armed levers 24 and 25 which are fulcrumed at 26 and 27 and are actuated by cams 28 and 29 for intermittently lifting the suckers. As this mechanism always lowers the two suckers to the same level over the pile 30, means must be provided whereby the pile is lifted after removal of each foil sheet or cover sheet. For this purpose the pile rests on a plate 31 resting upon shanks 32 fixed to a plate 33. The plate 33 has a vertical arm 34 provided with lugs whereby it engages a screw 35. The latter is intermittently rotated by means of a lever 36 for producing this rotation in conjunction with the vertical movement of the suckers. A cam 38 is fixed to the shaft 37 of the cam 15 and the said cam 38 intermittently actuates the lever 36. The latter acts by means of a pawl 39 on a ratchet wheel 40 connected by a bevel gear 41 to the screw 35. For making the adjustment by hand and for returning the plate 31 to its lowest position, the pawl 39 can be disengaged and the wheel 40 is provided with a handle 43. The suckers for lifting the foil consist of suction arms $g$ projecting from a tube $i$. These suckers carry a foil $f$ from the pile 30 to a horizontally reciprocating table 44 which also has a vertical movement which gradually decreases in proportion as the height of the pile of metal foil increases. For this purpose the cam 29 actuating the lever 25 of the cross arm 21 is formed with two depressions 111 and 112, the depression 111 being shallower than the depression 112 and serving to lower the sucker over the pile from which the sheets are taken whereas the deeper depression 112 serves to lower the sucker over the table 44. For this purpose the lever 25 which carries a roller 113 is alternately dropped by the said roller entering the depressions; the extent to which the depth of the depression 112 exceeds that of the depression 111 is approximately equal to the height of the pile to be placed on the table 44.

At the beginning of the separating operation the surface of the table 44 must to the same extent lie lower than the level of the top sheet of the pile. At the beginning of the operation the suction appliance $i$, $g$, $g$ descends equally toward the pile 30 and the table 44. In order that this descent toward the table is gradually reduced in proportion as the pile thereon grows, there is provided an abutment 45 which limits the descent of the roller 113 into the depression 112 and which is automatically moved upwardly at intervals, so that this descent is gradually reduced until it is equalized to the depth of the depression 111. The abutment 45 is engaged by means of an arm 46 with a screw 47 which is actuated by a cam 38 and a lever 50 provided with a pawl 49 which actuates a ratchet wheel 51 and bevel gear 52. The reciprocating table 44 is so controlled that the foil sheets $f$ as shown in Figs. 10 and 19 alternately overlap at opposite sides. This facilitates the separation of the sheets subsequently. For the purpose of so moving the table 44 the shaft 42 has an arm 53 which at each revolution lifts and drops a lever 55 by means of a lateral stud 54. The lever 55 acts by means of a pawl 56 on a ratchet wheel 57 which transmits the movement by means of a toothed gear 58 to a crank 59, the latter making half a revolution at each actuation of the lever 55; the crank 59 acts by means of a link 60 on a double armed lever 61 connected to the table 44. The table is thus moved alternately to the right and left while the arm 53 is acting on the arm 55. In the intervals the table 44 remains stationary in its end positions. These periods of rest coincide with the depositing of the foil sheets $f$. It may be mentioned that before the depositing of sheets on the table 44 begins, a sheet of paper is laid upon the latter and fastened down by means of transverse bars 109 inserted into grooves 110. The sucker $b$ used for lifting the cover sheets consists in the main of a hollow perforated tube or roller mounted by means of gudgeons 61$^a$ in transverse slots 62 of two lateral frames 63 and 64. The latter are fixed to a plate 65 whereby they are connected to the carrier or holder 2. To each of the gudgeons 61$^a$ is fixed a toothed wheel 66 and the two toothed wheels 66 mesh with racks 67 fixed to the frames 63 and 64. To the plate 65 is pivoted a single armed lever 68 engaging round one of the gudgeons 61$^a$ and having its other end in the path of a reversing lever 69 and abutment 70. For moving the lever 68 to the position shown at 68$^1$, the lever 69 is intermittently moved by a cam 71 from the position shown in solid lines to the position 69$^1$ shown in broken lines. The cam 71 is mounted upon the shaft 42. The return movement of the lever 68 is produced by the abutment 70 after the cover sheet has been delivered by the sucker $b$ at $e$. The return movement of the lever 69 to the position shown in solid lines may be produced by any suitable means, such as the cam 71 or the lever 68.

The action of the sucker $b$ is as follows: When the suction appliance $i$, $g$, $g$ has lifted a sheet of foil and while that sheet of foil is being moved toward the table 44, the sucker $b$ is applied to the top cover sheet near that edge $c$ which is remote from the side at which the sucker $b$ approaches in the direction of the arrow $l$. When the sucker $b$ descends upon the pile, the lever 68 assumes the position shown in Fig. 13 and lies against the lever 69, then the sucker acts and the cover sheet is pulled up at the edge, the foil beneath it being lifted in the box. The cam surface 16 and the cam 28 are so shaped that after the sucker has descended upon the pile, and has sucked the cover sheet, it temporarily remains in this position. During this time the lever 69 is moved by the cam 71 to position $69^1$ whereby it moves the lever 68 to position $68^1$. By this means the sucker is moved from right to left in the slot 62 and is rotated by reason of the engagement of the toothed wheel 66 with the rack 67. The sucker $b$ is thus moved to the position designated $b^1$ in Fig. 2, then the sucker gradually rises and travels toward $e$, where the sheet is to be dropped. In position $b^3$ of Fig. 2 or $b^4$ of Fig. 1 air is admitted to the sucker so that the suction action ceases and the cover sheet is released. The sucker then travels somewhat beyond the receptacle $e$ into the position shown in Fig. 10 and the carrier 2 of the sucker assumes the position $2^1$ indicated by broken lines in Fig. 13.

During the movement of the sucker beyond the receptacle $e$, the lever 68 is moved back to its original position by the abutment 70. By this means the sucker $b$ is rotated in the opposite direction so that its suction orifices assume their original position. Then the sucker $b$ returns to the pile 30 in order to pick up the next cover sheet. Meanwhile the suction appliance $i\ g\ g$ has lifted the next foil sheet. While the sucker $b$ is returning to the pile 30 the lever 69 is returned to the position shown in solid lines in Fig. 13, either by means of the cam 71 or by the lever 68. The suction appliance $i\ g\ g$ rises from the pile 30 immediately after picking up a foil sheet $f$ and is then traversed toward the table 44. Above the latter it is lowered by the action of the cam groove 112 and abutment 45, the lowering being regulated according to the height of the foil sheets on the table so that the suction appliance always descends to the level of the top sheet. The two suction appliances are served by a continuously acting air pump not shown in the drawings. This pump is associated with control mechanism 81 shown in Figs. 11 and 13 and with two cut off valves 76 shown in Figs. 10, 11, and 16 to 18. The control mechanism may be of any convenient kind. All that is essential is that it places the air pump alternately in communication with the suction conduit 72 leading to the sucker $b$ and with the suction conduit 73 leading to the suction appliance $i\ g\ g$. The mechanism shown comprises two cams 74 and two pairs of spring loaded levers 75 actuated by the said cams for the purpose of moving valves 126. The latter work in a valve box 77 connecting the suction conduit $113^a$ to the conduits 72 and 73. The valve devices 76 perform two functions; primarily their purpose is to prevent the passage of air to the air pump in case one of the suckers travels from the pile without having picked up a sheet. This is an important feature as otherwise the efficiency of the pump would be lowered. Another purpose of these valves is to effect stoppage of the movement of the table 44 in case the suction appliance $i\ g\ g$ travels to that table without carrying a foil sheet. As shown in Figs. 16 to 18 each of the said valve devices comprises a box having two compartments 78 and $78^1$ separated from each other by a valve 80 which is connected to a flexible diaphragm 79. To the latter is attached a shank 84 which extends out of the box and is adapted to disengage the pawl 56. The compartment 78 is connected to the control mechanism 81 and to the air pump and the compartment $78^1$ is connected to the suction appliance $b$ or $i\ g\ g$. Normally the valve 80 is in the closed position shown in Fig. 17, the diaphragm being then flat. If the sucker picks up a sheet, the closing of its orifices by the sheet causes a partial vacuum to be produced in both the compartments 78 and $78^1$, the air being able to pass through constricted ducts 82 formed in the valve and through the slightly permeable valve packing 83. The diaphragm 79 is thus dished as shown in Fig. 16 and pulls the shank 84 out of the path of the pawl 56. If on the other hand the sucker does not pick up a sheet, no vacuum is produced in the compartment $78^1$, but the vacuum on the other side of the valve causes the latter to be pressed tightly against its seat, so that no air can flow to the pump. The diaphragm 79 does not retract the shank 84 so that the latter disengages the pawl and the table 44 is not moved.

An electromagnetic device may be used for stopping the actuation of the table in case the suction appliance $i\ g\ g$ travels to same without carrying a sheet. In this case the shank or rod for disengaging the pawl 56 is attached to the core of a solenoid 114 or to the armature of an electromagnet, so that it is retracted and rendered inoperative if the circuit of the said solenoid or magnet is closed. The closing of the circuit is effected by the presence of a foil sheet $f$ on the suction appliance traveling toward the table 44. A spring 119 tends to hold the shank 84 in the path of the pawl 56. The circuit of the solenoid includes a battery 115 and the machine itself which is connected by a wire 117 to a contact 116 arranged in the path of the suction tube $g^1$. The latter is insulated from the suction tube $g$ which is connected to the battery 115. The insulation of the tube $g^1$ is effected by means of an insulating prolongation 118 of the tube $i$. The action of this device is as follows: If the suction appliance $i$ $g$ $g^1$ travels to the table 44 without carrying a foil sheet the electric circuit remains open and the shank 84 held in the path of the pawl by the spring 119 disengages the pawl so that the table is not moved. If on the other hand the suction appliance picks up a foil sheet $f$, the latter electrically connects the two suction devices $g$ and $g^1$, so that the electric circuit is closed and the shank 84 is retracted. Both with this electromagnetic device and with the device actuated by the valve 80, the lever 55 may be provided with a hand lever 85, enabling the table 44 to be moved independently of the actuating mechanism. As shown in Figs. 10, 11 and 15, the pulley 86 is loosely mounted on the driven shaft 42, and is provided with clutch members 87 adapted to coact with a clutch member 89 fixed to the shaft, the clutch being thrown into gear by means of a wedge piece 90. The latter has a vertical slot 120 and is laid in vertical grooves 121 formed in two rings 122 and 123 upon the shaft. The ring 122 abuts against the collar 124 on the shaft and the ring 123 abuts against the pulley 86. The wedge 90 is connected to a lever 91 which is held in the position shown in Fig. 10 by a pawl 93 associated with the armature of an electromagnet 95 and acting against a spring 92. The pawl 93 engages under a projection 94 on the lever 91. The electromagnet 95 is in a circuit including a battery 125 and the machine. The left terminal of battery 125 is grounded through the machine frame. This circuit can be closed by means of a switch 96 connected by a wire 97 to the magnet. If this circuit is closed by means of the switch the electromagnet 95 attracts the pawl 93 which releases the lever 91 so that the latter rocks downward and retracts the wedge 90, whereby the drive is stopped.

To prevent torn foil sheets from being placed upon the table 44 the machine is provided with an insulated metal bar 98, Figs. 10, 11, 12, lying in the path of the suction appliance $i$, $g$, $g$, at such a level that the intact foil sheets carried by the suction tubes will just pass over this bar without contacting therewith, whereas a torn and depending foil sheet will make contact with the said bar. The latter with the electromagnet 95 is in a circuit including the battery 125 and the suction appliance $i$, $g$, $g$. Between this suction appliance and the bar 98, there is a gap in the circuit, but the bar 98 is connected by wire 99 to the electromagnet 95. If a torn foil sheet is carried over the bar, it closes the circuit so that the electromagnet attracts the pawl 93 and releases the lever 91. If an electromagnetic device is used for stopping the movement of the table 44 as shown in Figs. 20 to 23, the solenoid 114 may be arranged in the circuit used for the uncoupling device. If the sucker $b$ is surrounded by a sleeve of gauze, a thin conductive wire must be placed around said sleeve for making electric contact.

In order that the machine automatically stops after the separation and transfer of a predetermined number of foil sheets, the table 44 is associated with a counting device 100, which after the depositing of a predetermined number of sheets makes contact with a stud 101, and thus closes an electric circuit, including the battery 125, the pin 101 being connected to the magnet by a wire 102. The counter shown in Figs 10 and 12 includes a screw spindle 103 carrying a numeral drum 104 with numerals 0 to 9 and a transfer wheel 105 having 10 teeth. At each to and fro movement of the table 44 an anchor shaped lever 106 rotates the transfer wheel 105 to the extent of one tooth space. On the spindle 103, there is a nut 108 which can be adjusted by a scale 107, according to the number of sheets to be transferred. Assuming the adjustment is made at 150, the nut gradually moves to zero during the reciprocation of the table 44. Arrived at zero, the nut makes contact with the stop 101 and thus closes the electric circuit whereby the pawl 93 is disengaged.

It will be understood that the machine may comprise a plurality of sucker systems $b$ and $i$, $g$, $g$, arranged side by side, each adapted to operate independently of the others.

What I claim as my invention and desire to secure by Letters Patent of the United States is:—

1. In apparatus for the purpose set forth the combination, with a support for a pile of sheets, of a perforated suction tube, means for lowering and raising said tube over said support and traversing same across the support, a second suction tube, parallel branch tubes projecting from said second tube and having flat oblique faces with perforations therein, and means for lowering and raising said second tube over said support.

2. In apparatus for the purpose set forth, the combination, with a support for a pile of sheets, of a perforated suction tube, means for lowering and raising said tube over said support and traversing same across the support, means for partly rotating said tube while it is lowered over the support, a second suction tube, parallel branch tubes projecting from said second tube and having flat oblique faces with perforations therein, and means for lowering and raising said second tube over said support.

3. In apparatus for the purpose set forth the combination, with a support for a pile of sheets, of a suction tube, means for lowering and raising said tube over said support and traversing same across the support, means including a rack bar and pinion for partly rotating said tube while it is lowered over the support, a second suction tube, parallel branch tubes projecting from said second tube and having flat oblique faces with perforations therein, and means for lowering and raising said second tube over said support.

4. In apparatus for the purpose set forth the combination, with means for supporting a pile of sheets, of a suction tube, a carrier on which said tube is movable, means for raising and lowering said carrier and traversing same across the pile, a rack on said carrier, a pinion fixed to said tube meshing with said rack, a lever pivoted to said carrier and engaging said tube, an abutment in the path of said lever and adapted to rock same in one direction, whereby the pinion is rolled on said rack, a lever adapted to strike the first-mentioned lever and rock same in the opposite direction, a second suction tube, parallel branch tubes projecting from said second tube and having flat oblique faces with perforations therein, and means for lowering and raising said second tube over said support.

5. In apparatus for the purpose set forth, the combination of a support for a pile of sheets, means for removing certain of said sheets comprising a suction tube having perforated parallel branches adapted to engage sheets, fine-meshed textile material covering the perforations in said branches, and means for raising and lowering said suction tube relatively to said support.

6. In apparatus for the purpose set forth the combination, with a support for a pile of sheets, of a suction tube, parallel branch tubes projecting from said suction tube and having suction faces with perforations therein, adapted to hold a sheet, a table, means for raising and lowering said tube over said support and over said table, means for traversing said tube between said table and support, and means for reciprocating said table with intervals of rest in its end postions.

7. In apparatus for the purpose set forth the combination, with a support for a pile of sheets, of a suction tube, parallel branch tubes projecting from said suction tube and having suction faces with perforations therein adapted to hold a sheet, a table, means for raising and lowering said tube over said support and over said table, means for traversing said tube between said table and support, means automatically regulating the lowering of said tube over said table in proportion as the pile of sheets thereon grows, and means for reciprocating said table, with with intervals of rest in its end positions.

8. In apparatus for the purpose set forth the combination, with a support for a pile of sheets, of a suction tube, parallel branch tubes projecting from said suction tube and having suction faces with perforations therein, adapted to hold a sheet, a table, means for raising and lowering said tube over said support and over said table, means for traversing said tube between said table and support, means for reciprocating said table, with intervals of rest in its end positions, and means whereby the movement of said suction tube toward said table, without a sheet, puts said reciprocating means out of operation.

9. In apparatus for the purpose set forth the combination, with a support for a pile of sheets, of a suction tube, parallel branch tubes projecting from said suction tube and having suction faces with perforations therein adapted to hold a sheet, a table, means for traversing said tube between said table and support, means including a pawl and ratchet gear for reciprocating said table, and a device adapted to put said pawl out of operation and to be rendered inoperative by a sheet carried by said branch tubes to said table.

10. In apparatus for the purpose set forth the combination, with a support for a pile of sheets, of a suction tube, parallel branch tubes projecting from said suction tube and having suction faces with perforations therein adapted to hold a sheet, a table, means for raising and lowering said tube over said support and over said table, means for traversing said tube between said table and support, means for reciprocating said table, with intervals of rest in its end positions and means for moving said table to its end positions by hand.

11. In apparatus for the purpose set forth the combination, with a support for a pile of sheets, of a suction tube, parallel branch tubes projecting from said suction tube and having suction faces with perforations therein adapted to hold a sheet, a table, means for raising and lowering said tube over said support and over said table, means for traversing said tube between said table and support, and means for reciprocating said table, with intervals of rest in its end positions, said table having grooves enabling a sheet of paper to be clamped thereon.

12. In apparatus for the purpose set forth the combination, with a support for a pile of sheets, of a perforated suction tube, means for lowering and raising said tube over said support and traversing same across the support, a second suction tube, perforated branch tubes projecting from said second tube, means for raising and lowering said second tube over said support, suction conduits connected to said first and second tubes respectively, and in each of said suction conduits a valve device adapted to be closed by a stream of air entering said conduit through the perforated tube.

13. In apparatus for the purpose set forth the combination with a support for a pile of sheets, of a perforated suction tube, means for lowering and raising said tube over said support and traversing same across the support, a second suction tube, perforated branch tubes projecting from said second tube, means for raising and lowering said second tube over said support, suction conduits connected to said first and second tubes respectively, and in each of said suction conduits a valve device adapted to be closed by a stream of air entering said conduit through the perforated tube, said valve device comprising a valve box, a valve in said box, dividing same into two compartments, and a flexible diaphragm in one of said compartments, connected to said valve.

14. In apparatus for the purpose set forth the combination, with a support for a pile of sheets, of a suction tube, perforated branch tubes projecting from said suction tube, and adapted to hold a sheet, a suction conduit connected to said suction tube, means for lowering and raising said suction tube over said support, a table, means for traversing said suction tube between said support and said table, means for reciprocating said table, a valve device in said suction conduit, adapted to be closed by a stream of air entering said conduit through said perforated tubes and suction tube, and means associated with said valve device whereby the latter renders said reciprocating means inoperative when the valve is closed.

15. In apparatus for the purpose set forth the combination, with a support for a pile of sheets, of a suction tube, perforated branch tubes projecting from said suction tube and adapted to hold a sheet, a suction conduit connected to said suction tube, means for lowering and raising said suction tube over said support, a table, means for traversing said suction tube between said support and said table, said traversing means including a clutch, and means for disengaging said clutch when a torn sheet depends from said branch tubes.

16. In apparatus for the purpose set forth the combination, with a support for a pile of sheets, of a suction tube, perforated branch tubes projecting from said suction tube and adapted to hold a sheet, a suction conduit connected to said suction tube, means for lowering and raising said suction tube over said support, a table, means for traversing said suction tube between said support and said table, said traversing means including a clutch, means for reciprocating said table, means for disengaging said clutch, and a counting device associated with said reciprocating means and adapted to actuate the means for disengaging the clutch.

In testimony whereof I hereunto affix my signature in the presence of two witnesses.

JACOB HEINRICH.

Witnesses:
GRET. PHIL. BOCK,
H. LIGHTING.